United States Patent [19]
Bapst

[11] Patent Number: 6,155,638
[45] Date of Patent: Dec. 5, 2000

[54] CHILD RESTRAINT SEAT HAVING AMPLIFIED MOTION HARNESS ADJUSTER

[75] Inventor: David M. Bapst, South Wales, N.Y.

[73] Assignee: Fisher-Price, Inc., East Aurora, N.Y.

[21] Appl. No.: 09/123,407

[22] Filed: Jul. 28, 1998

[51] Int. Cl.[7] ................................................ A47C 1/08
[52] U.S. Cl. ...................................... 297/250.1; 297/484
[58] Field of Search ............................... 297/250.1, 484, 297/483, 468, 256.15, 467, 464

[56] References Cited

U.S. PATENT DOCUMENTS

| | | | |
|---|---|---|---|
| 3,887,233 | 6/1975 | Garavaglia et al. . | |
| 4,040,664 | 8/1977 | Tanaka et al. | 297/389 |
| 4,770,468 | 9/1988 | Shubin . | |
| 4,790,601 | 12/1988 | Burleigh t al. | 297/484 |
| 5,022,669 | 6/1991 | Johnson . | |
| 5,082,325 | 1/1992 | Sedlack . | |
| 5,092,004 | 3/1992 | Cone et al. | 5/94 |
| 5,115,523 | 5/1992 | Cone | 5/94 |
| 5,294,185 | 3/1994 | Koyanagi et al. | 297/484 |
| 5,303,979 | 4/1994 | Koyanagi et al. | 297/250 |
| 5,527,093 | 6/1996 | Park . | |
| 5,899,534 | 5/1999 | Gray . | |

Primary Examiner—Milton Nelson, Jr.
Attorney, Agent, or Firm—Morgan, Lewis & Bockius LLP

[57] ABSTRACT

A child restraint seat is shown having a system for tightening the safety harness belt that includes an adjuster plate with the adjuster plate being slidably mounted on a guide track on the back side of the restraint seat. The adjuster plate includes a belt tensioning portion that contacts the safety harness belt at various positions between two opposite fixed ends of the safety harness belt. Movement of the adjuster plate along the guide track on the back side of the restraint seat causes the belt tensioning portion of the adjuster plate to change the slack length of the safety belt by an amount approximately equal to two times the distance which the adjuster plate is moved along the guide track. A pawl is part of the adjuster plate assembly and is biased into contact with teeth on the guide track to hold the adjuster plate in a predetermined position along the guide track.

25 Claims, 12 Drawing Sheets

6,155,638

CHILD RESTRAINT SEAT HAVING AMPLIFIED MOTION HARNESS ADJUSTER

FIELD OF THE INVENTION

This invention relates to a child restraint seat having harness straps that extend through a back portion of the child restraint seat and are adjusted by a harness adjuster.

BACKGROUND OF THE INVENTION

Conventional child restraint seats include harness straps for holding a child within the seat. As shown in U.S. Pat. No. 4,040,664 to Tanaka et al., a child restraint seat includes slots provided through the child restraint seat for passage of part of the harness from the front side to the rear side of the seat and providing anchoring means on the rear side of the seat for anchoring the harness at selected vertical locations on the rear side of the seat. In the system taught by Tanaka et al. the harness may include a hook and an anchoring means that includes a plurality of vertically spaced receiving openings for receiving the hook at selected vertical positions for adjusting the harness. Before placing a child in the child restraint seat taught by Tanaka et al., the hook must be removed from its associated opening on the rear of the seat in order to create enough slack in the harness belts on the front side of the seat to position the harness belts over the shoulders of the child. In conventional child restraint seats such as the one taught by Tanaka et al., there is a one-to-one correspondence between the amount of movement of the anchoring end of the harness straps and the amount of slack that is either created or removed from the harness straps on the front side of the child restraint seat. Additionally, adjustment of the amount of slack in the harness belts with conventional child restraint seats generally requires the use of two hands, and the anchoring end of the harness straps must be moved by a large amount to create enough slack for placing a child underneath the harness straps on the front side of the seat. In seats such as that taught by Tanaka et al., the slackened belts are laid on the seat while the child is placed in the seat. The adult must then draw the belts from behind the child to fasten the harness straps over the shoulders of the child.

In view of the foregoing problems with adjustment of harness straps on conventional child restraint seats, the process of placing a child in the child restraint seat and adjusting the harness straps to a proper tightness is generally a time consuming and complicated operation.

SUMMARY OF THE INVENTION

A child restraint seat according to an aspect of the present invention has front and rear sides and a shoulder harness for maintaining the child against the front side of the seat. The seat also has slots for passage of part of the harness from the front side to the rear side of the seat. The shoulder harness could be a single continuous harness belt that feeds through the seat, over one shoulder of the child, and back through the seat before passing over the other shoulder. Alternatively, two separate shoulder belts could be fed through the seat from fixed points at the rear of the seat, over the shoulders of the child and back through the seat to additional fixed points.

The present invention achieves a multiplication of the amount of change in length of shoulder belts available at the front of the seat as a function of the movement of an adjuster on the rear of the seat. The multiplication effect is desirable in order to minimize the amount of adjustment necessary at the rear of the seat to produce enough slack in the shoulder belts on the front side of the seat so that the shoulder belts can be draped over the sides of the car seat while a child is placed in the seat.

An adjuster on the rear of the seat achieves the desired multiplication effect by using the principle of operation of a pulley or block and tackle. The adjuster moves along an intermediate portion of the belt on the rear of the seat between the fixed end(s) of the belt and the opening through the seat where the belt passes from the rear side of the seat to the front side of the seat. The amount of change in the slack length of belt on the front side of the seat is equal to the total change in length of belt on the rear side of the seat. A movement of the adjuster along the intermediate portion of the belt by a distance X will change the length of belt on the rear side of the seat by 2X if the belt passes one time over the adjuster. In alternative embodiments, an even greater multiplication effect could be achieved by looping the belt more than once between fixed points on the rear of the seat and the movable adjuster.

In a preferred embodiment, the adjuster on the rear side of the seat includes a guide track and an adjuster plate slidably mounted on the guide track. The shoulder belts can pass through openings in the seat from the front side of the seat to the rear side of the seat and then through openings in the adjuster plate to a connector bar that fixes the shoulder belts relative to the seat. The connector bar to which the ends of the shoulder belts are attached can be fixed at one end of the guide track such that movement of the adjuster plate along the guide track by a predetermined distance toward or away from the connector bar results in a change in the amount of slack length of the shoulder belts that is two times the amount of movement of the adjuster plate along the guide track.

The adjuster plate includes a locking mechanism such as a spring-loaded pawl that is biased into contact with teeth on the guide track in order to position the adjuster plate relative to the guide track. The pawl can be pivotally moved to release the adjuster plate and allow movement of the adjuster plate along the guide track using a single hand. As the adjuster plate is moved along the guide track the ends of the shoulder belts remain fixed in position relative to the car seat by the connector bar. Smooth edges of the openings through the adjuster plate for passage of the shoulder belts slide along intermediate portions of the shoulder belts and change the length of an occupant engaging portion of the shoulder belts on the front side of the seat by two times the movement of the adjuster plate.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENTS

Figure 1A:
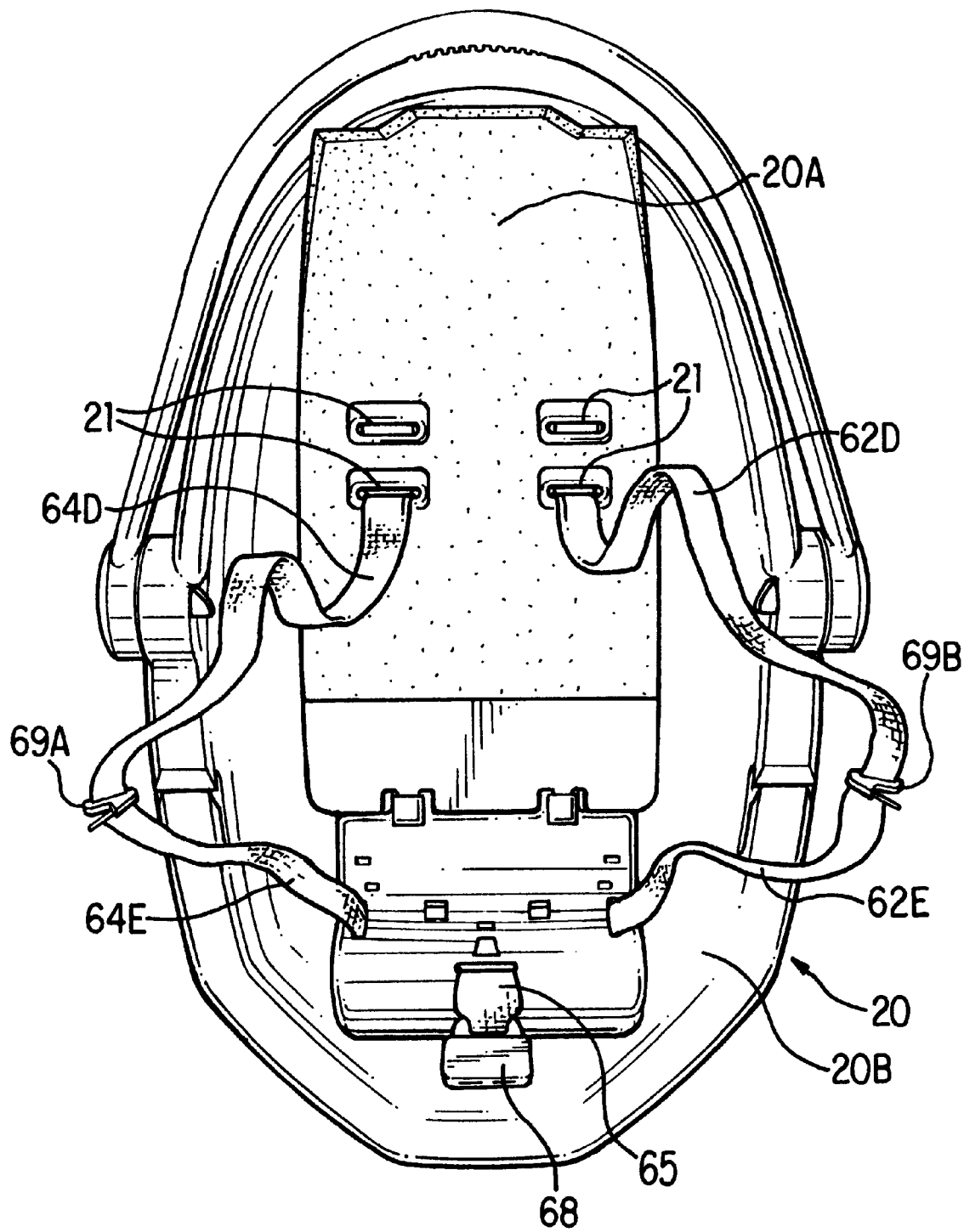
FIG. 1A is a front elevation view showing the harness assembly with the harness latches draped over the sides of the seat to provide clearance for placing a child in the seat.
Figure 1B:
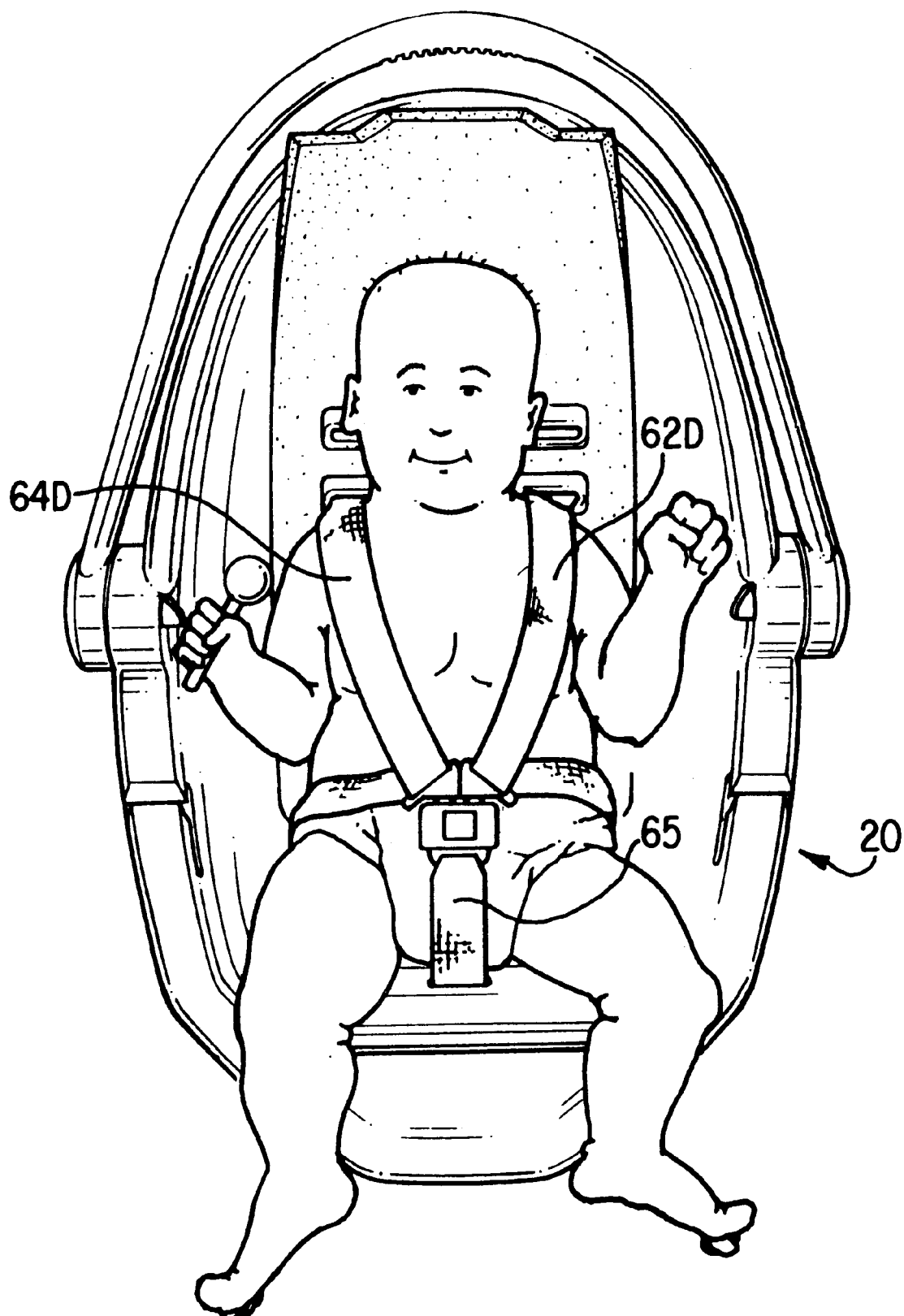
FIG. 1B is a front elevation view showing a child seated in the seat with the harness assembly buckled and drawn snugly over the shoulders of the child.

A restraint system embodying the principles of the invention is illustrated in FIGS. 1A and 1B in the context of an infant seat usable in a car, grocery cart, or a carrier. It will be is apparent to the artisan that the same principles can be applied to a restraint system for use in any other application in which it is desired to have an adjustable restraint, including toddler car seats, strollers, high chairs, etc.

The restraint system includes left and right shoulder straps or belts that pass through openings in the seating surface on which the occupant is to be restrained. One end of each shoulder strap is anchored on the rear side of the seating surface. If the shoulder straps are separate belts, the end of each shoulder strap opposite the end anchored on the rear side of the seat can be anchored at or below the front side of the seating surface. If the shoulder straps are part of one continuous harness, opposite ends of the harness are anchored on the rear side of the seating surface, with a central portion of the harness being anchored at or below the front side of the seating surface.

An adjuster disposed on the rear side of the seating surface engages the portion of the shoulder straps between the rear anchor points and the seat back openings. Movement of the adjuster in one direction draws the shoulder straps through the openings in the seat back, shortening the length of belt available on the front side of the seat between the seat back openings and the front or lower anchor points, thereby tightening the shoulder straps on the occupant. Movement of the adjuster away from the rear anchor points beyond the seat back openings pulls the shoulder straps through the openings by an amount that is twice the amount of movement of the adjuster. This multiplying effect provides a far greater range of length adjustment of the harness for a given range of movement of the adjuster than is provided by known harness adjusting systems.

In the embodiment illustrated in FIGS. 1A and 1B, and described below, an infant seat 10 includes a seat body 20, a harness assembly 60, and an adjuster 40. Seat body 20 is a one-piece, integrally molded plastic shell of conventional construction. Seat body 20 has a front surface that defines a seating area 20E for the infant occupant, and includes a front seat portion 20A and a back portion 20D. Vertically spaced openings 21 are formed through the back portion 20D. Although seating area 20E is shown as a molded plastic shell, in actual lo use soft goods could be placed over the shell with appropriate openings therethrough for passage of the shoulder belts etc. in order to provide a cushioned surface for seating.

The shoulder belts can be passed through selected openings 21 appropriate for the height of the occupant. Harness assembly 60 includes left and right shoulder belts 62 and 64, respectively, and crotch strap 65. Shoulder belts 62 and 64 are coupled to crotch strap 65 by a conventional buckle assembly 67, which includes a female portion 68 fixed to the end of crotch strap 65, and left and right male tongues 69A and 69B slidably mounted on left and right shoulder belts 62 and 64, respectively. The arrangement of right shoulder belt 64 is described below and illustrated in FIG. 3 (the arrangement of left shoulder belt 62 being identical).

Figure 3:
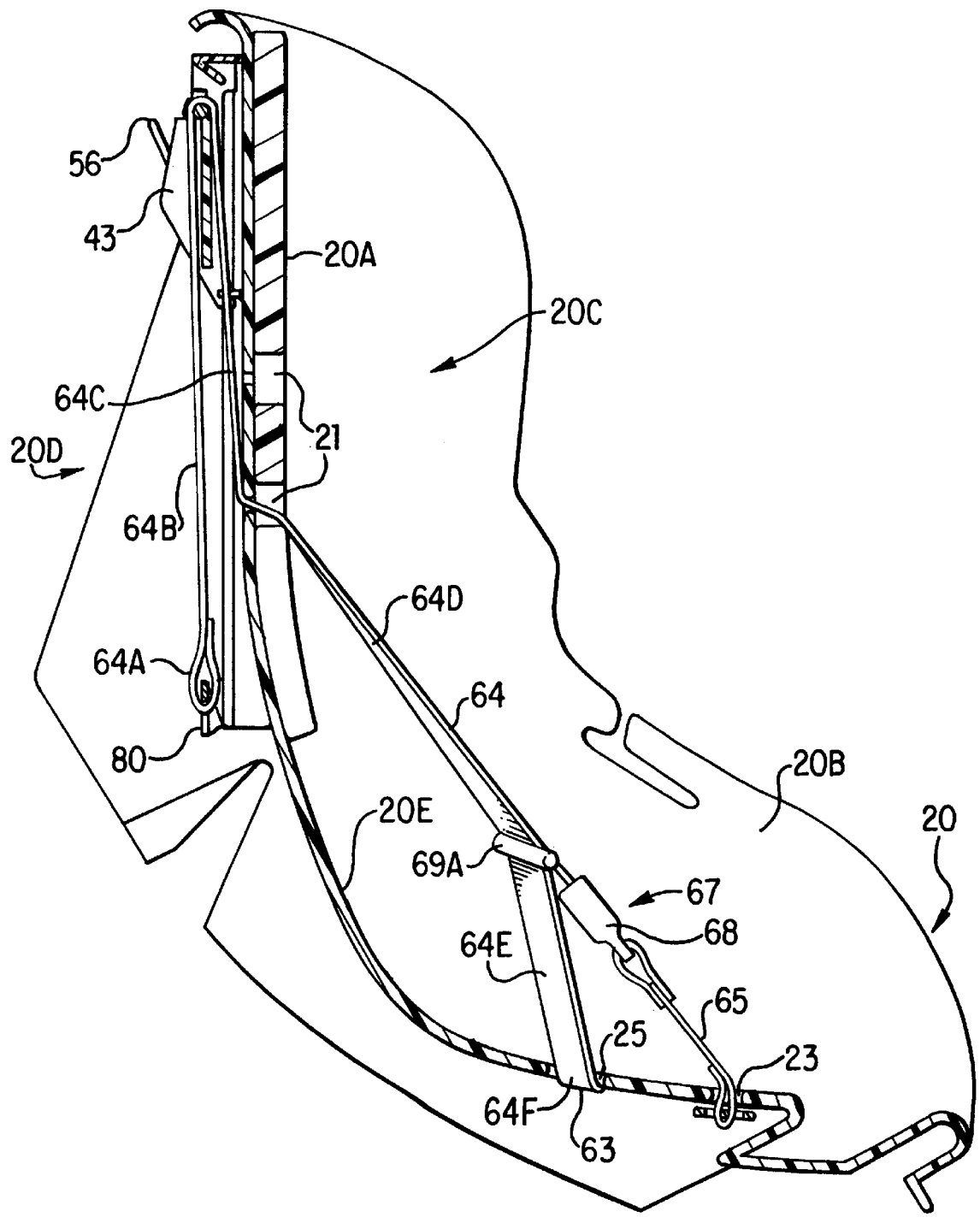
FIG. 3 is a side elevation view taken along line 3—3 in FIG. 2A showing the harness belt passing through the seat and looped over the adjuster plate before terminating at the connector bar across one end of the guide track.

As shown in FIG. 3, shoulder belt 64 passes from a front side 20C to a rear side 20D of the seat body 20 through openings 21 in the seat. Shoulder belt 64 is anchored at a rear end 64A to a suitable anchor point on the rear of the seat body 20, such as on one end of a connector bar 80 fixed to seat body 20. The opposite front end of shoulder belt 64 is anchored on the lower side of seat portion 20B. In a preferred embodiment, both shoulder belts 62, 64 are formed from a single piece of webbing, and are joined together at their respective front ends by a center portion 63 disposed on the lower side of seat portion 20B.

Figure 2A:
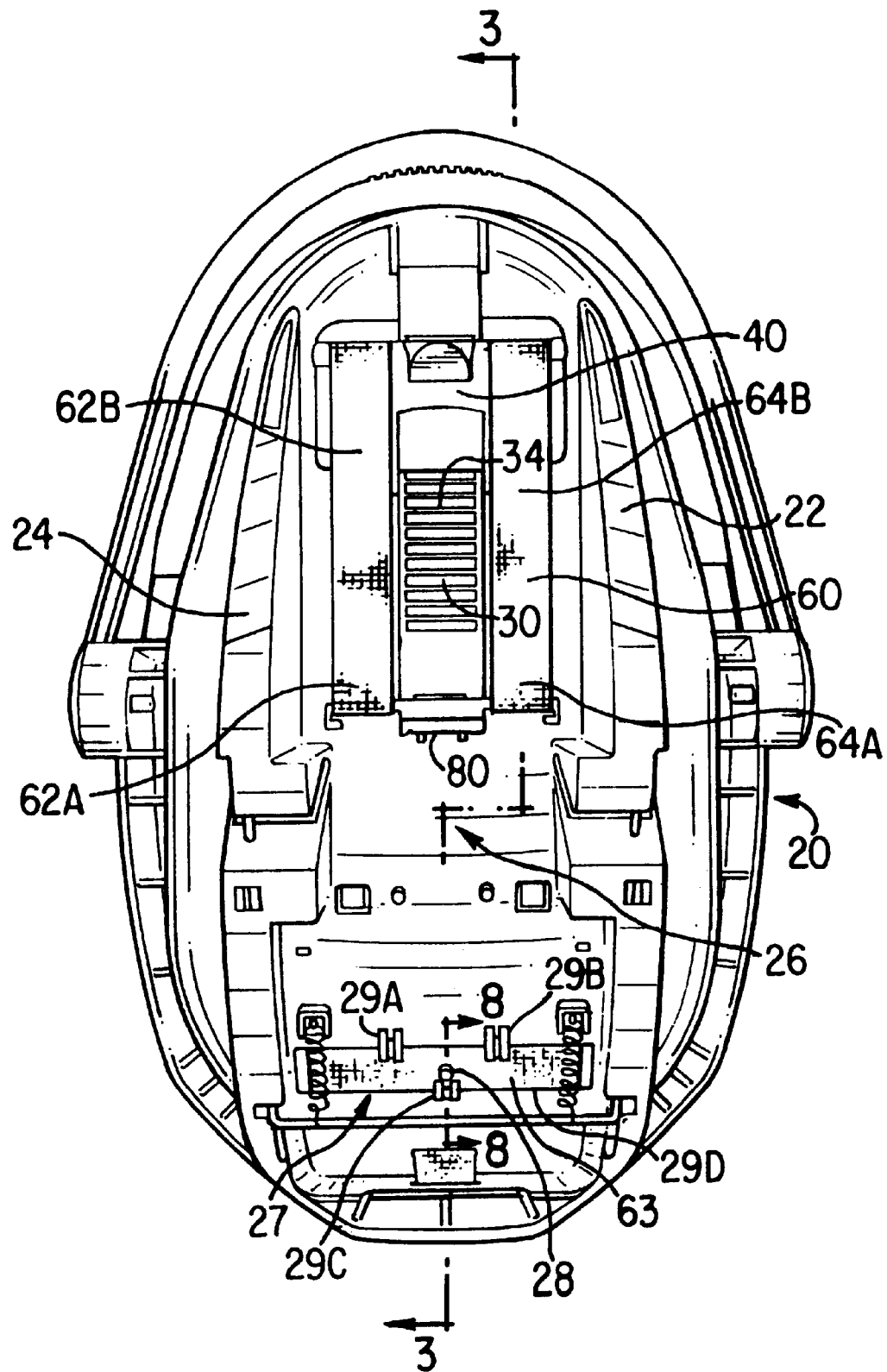
FIGS. 2A is a rear elevation view showing the harness belts, the guide track, and the adjuster plate.
Figure 8:
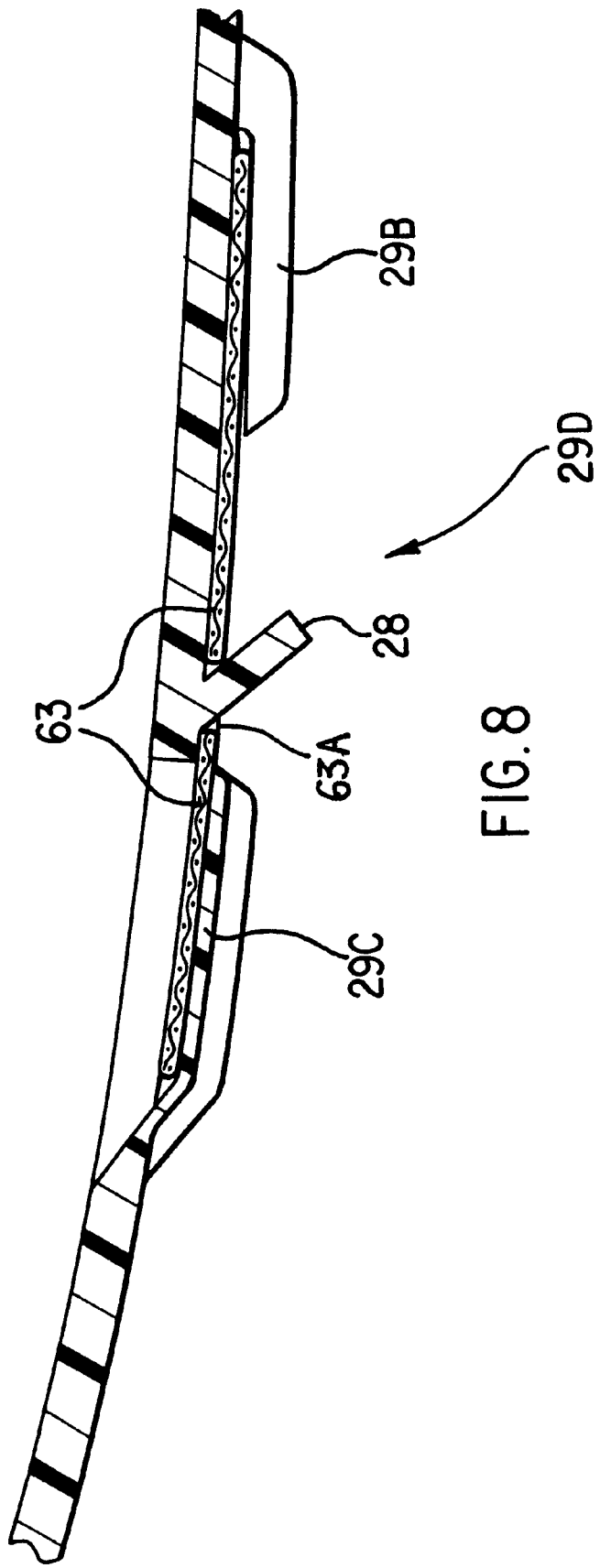
FIG. 8 is a cross sectional view taken along line 8—8 in FIG. 2A to show the anchoring of the belts to the seat by the belt retainer.

As shown in FIGS. 2A and 8, center portion 63 is fixed in position on the lower side of seat portion 20B by belt retainer 27. Belt retainer 27 includes a post 28, upper retainer arms 29A and 29B, and lower retainer arm 29C disposed about a belt receiving area 29D. The retainer arms are L-shaped in cross section, with one leg extending away from the lower side of the seat and the other leg extending parallel to the lower side toward and over the belt receiving area 29D. Center portion 63 of the shoulder belt webbing is formed with a post-receiving hole 63A (such as by a heat-piercing operation). Center portion 63 is disposed in belt receiving area 29D, with its lateral edges disposed beneath retainer arms 29A, 29B, and 29C, and post-receiving hole 63A mounted on post 28. The engagement of post-receiving hole 63A and post 28 fixes the position of center portion 63 with respect to body 20 both longitudinally and laterally. The retainer arms retain center portion 63 to prevent it from sliding off of post 28. Since center portion 63 is fixed with respect to body 20, shoulder belts 62, 64 are also fixed.

In an alternative embodiment, shoulder belts 62, 64 are formed of separate pieces of webbing, and their respective front ends are independently anchored to seat body 20 by any suitable techniques, which techniques will be readily apparent to the artisan.

Regardless of whether the shoulder belts are formed of one or two pieces of webbing, the total length of each shoulder belt between the front and rear ends is fixed. This total length can be distributed between the front and rear sides of seat body 20 by movement of adjuster 40. Referring to FIG. 3, the portion of shoulder belt 64 on the rear side of the seat includes a first segment 64B between rear end 64A and the adjuster, and a second segment 64C between the adjuster and seat back opening 21. The portion on the front side of the seat includes a third segment 64D between opening 21 and male tongue 69A of buckle assembly 67, and a fourth segment 62E between male tongue 69A and the front end 64F of the shoulder belt 64.

The amount by which the length of the portion of shoulder belt 64 on the front side of the seat (segments 64D and 64E) can be varied is referred to as a slack length. The slack length is preferably at least equal to the amount of length adjustment required to accommodate the range of sizes of occupants for which the seat is designed. The slack length is preferably also long enough that the male tongues 69A and 69B can be draped over the sides of seat body 20 (as shown in FIG. 1A) so that when a child is placed in the seat, the child will not be placed on the shoulder belts. This allows the adult to easily couple the male tongues to the female portion 68 (as shown in FIG. 1B).

The slack length also corresponds to the change in length of belt on the rear side of the seat. The total length of belt on the rear side of the seat is a function of the distance between the fixed ends of the belt and the movable adjuster 40 and the distance between the movable adjuster 40 and the openings 21 in the seat through which the shoulder belts 62, 64 pass. In the embodiment shown in the figures, a movement of the adjuster by a distance X results in a change in the total length of belt on the rear side of the seat by 2X. Therefore, the change in slack length of belt on the front side of the seat is two times the amount of movement of the adjuster on the rear side of the seat.

Figure 5:
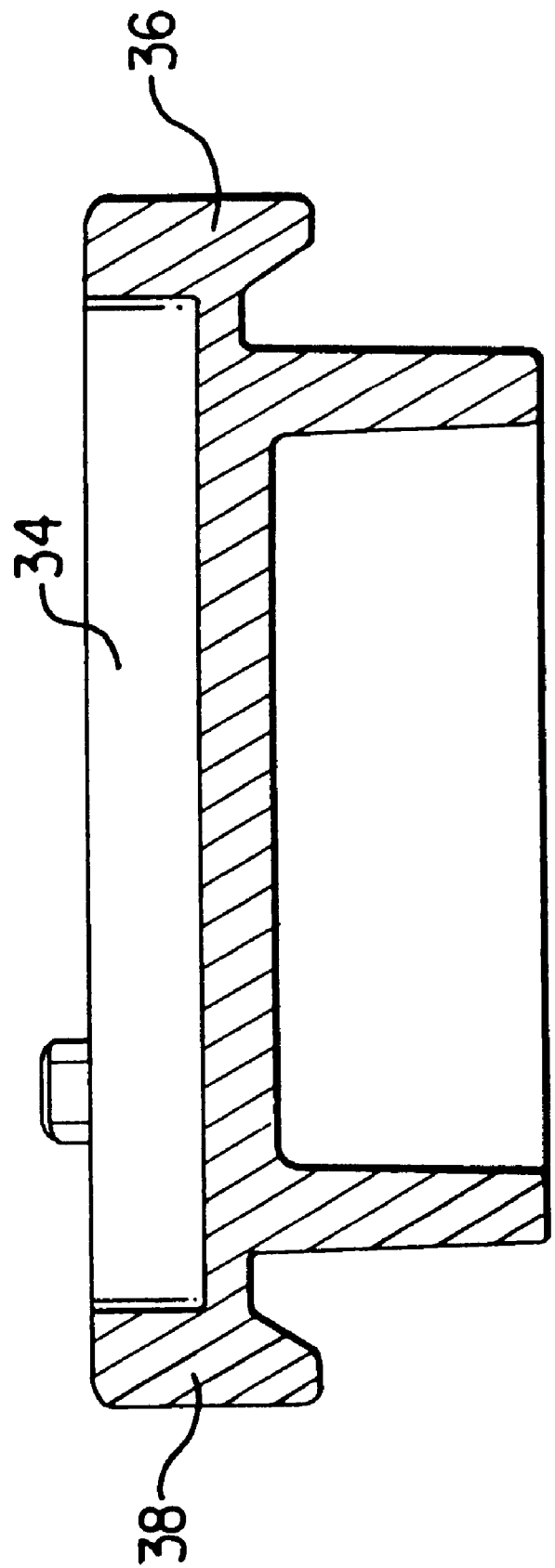
FIG. 5 is an end cross sectional view of the guide track taken along line 5—5 of FIG. 2C showing the guide ribs.

In one aspect of the preferred embodiment shown in the figures, two integrally molded, arcuate rocker rails 22, 24 extend from the rear side of the seat along both sides of a longitudinal central portion 26 of the back of the seat. A guide track 30 can be molded integrally with the seat or otherwise attached to the seat in a longitudinal direction between the rocker rails 22, 24. The guide track 30 is an elongated member having a plurality of laterally extending teeth 34 along its length, with opposite longitudinal sides of the guide track being undercut to form parallel guide rails 36, 38 on both sides of the guide track, as best seen in FIG. 5. The guide rails 36, 38 extend downwardly from the upper surface of the guide track along which the lateral teeth 34 are formed.

Figure 4A:
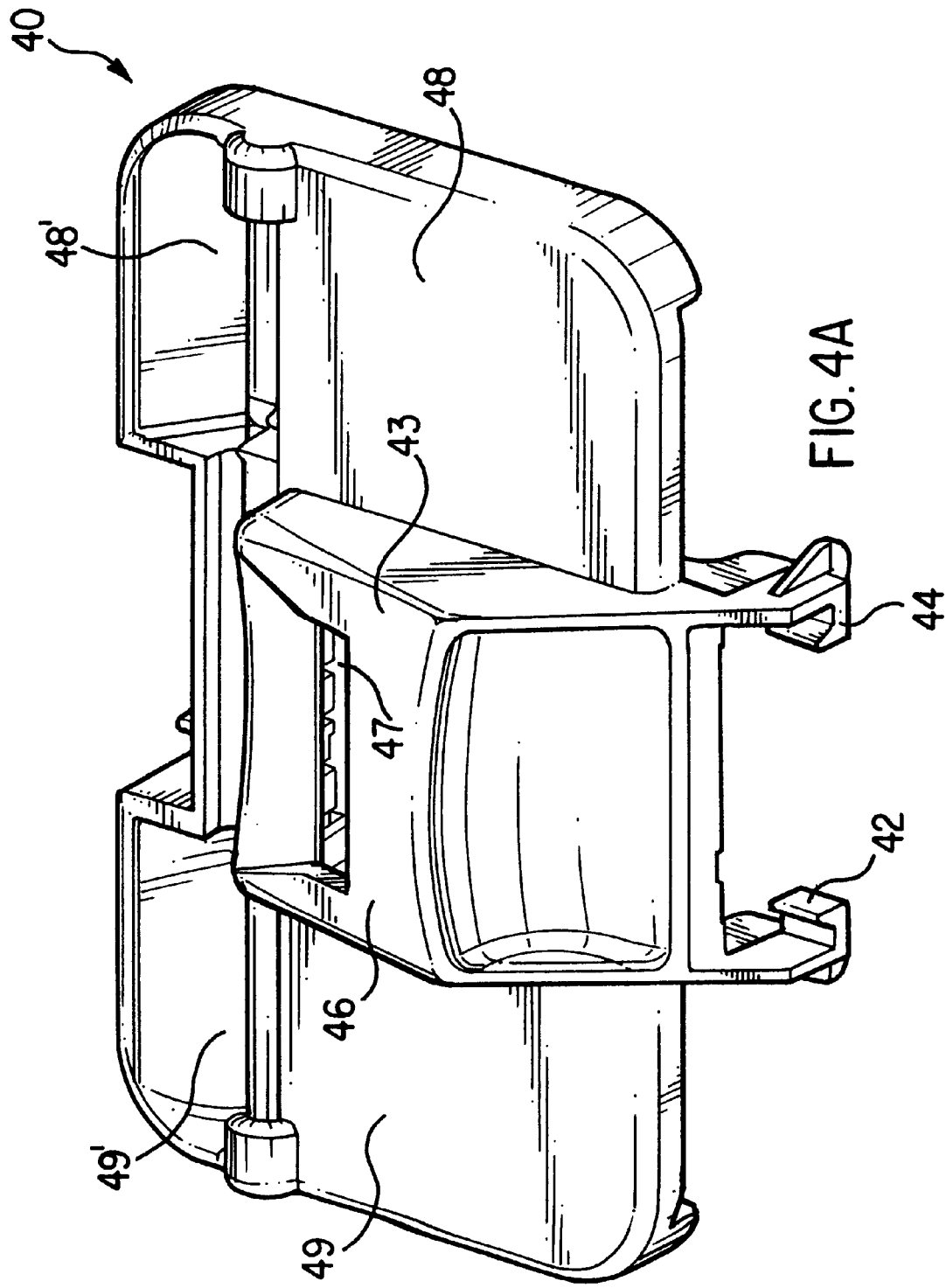
FIGS. 4A and 4B are front and rear perspective views of the adjuster plate shown in FIG. 2A.
Figure 4B:
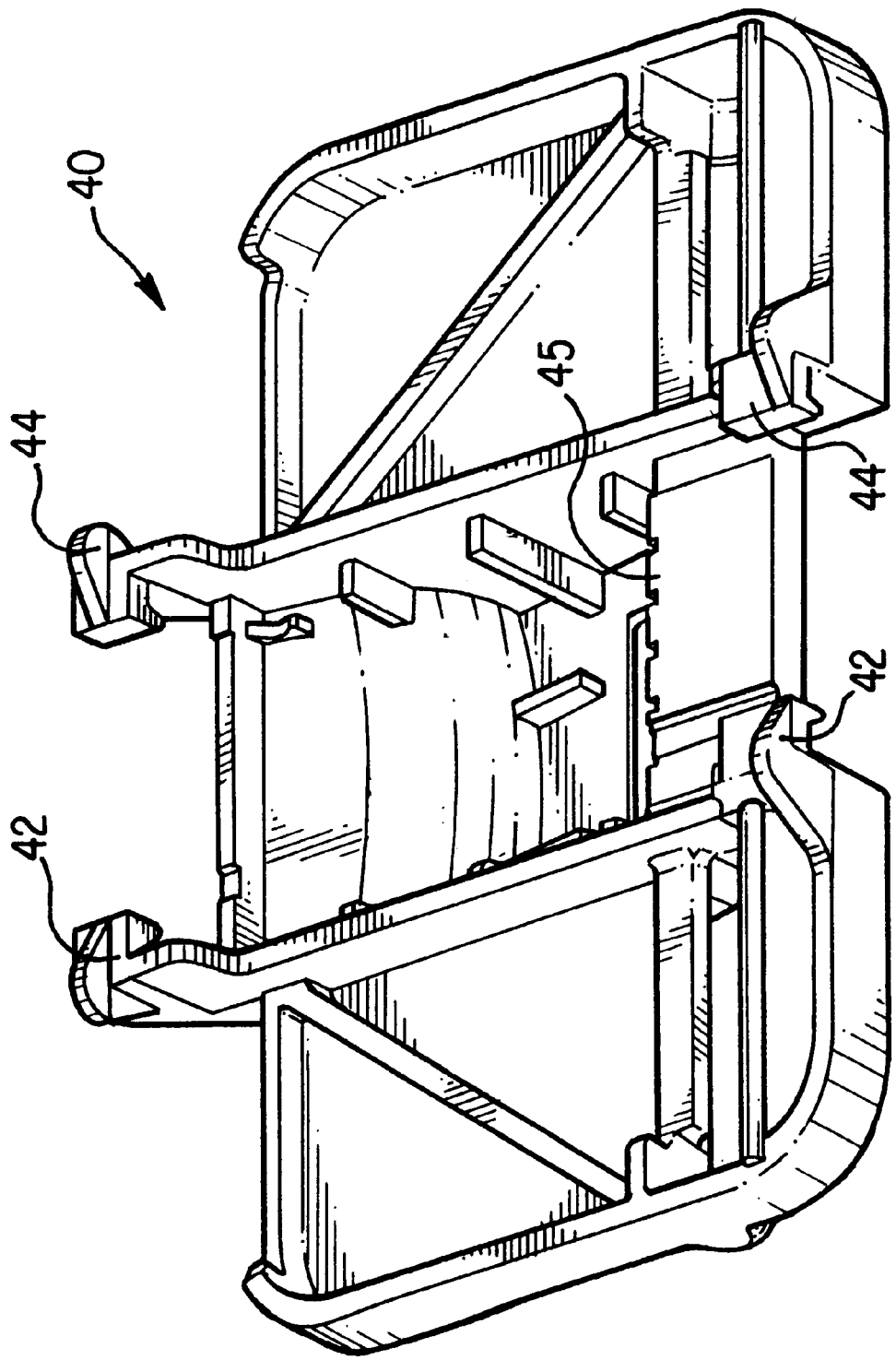

An adjuster plate 40 can also be formed from one-piece molded plastic and having parallel guide rails 42, 44 for engagement with the guide rails 36, 38 of the guide track 30. As shown in FIGS. 4A and 4B, the adjuster plate 40 is generally rectangular shaped with a central guide track engaging portion 46 and opposite laterally extending harness belt guide surfaces 48, 49.

Figure 7:
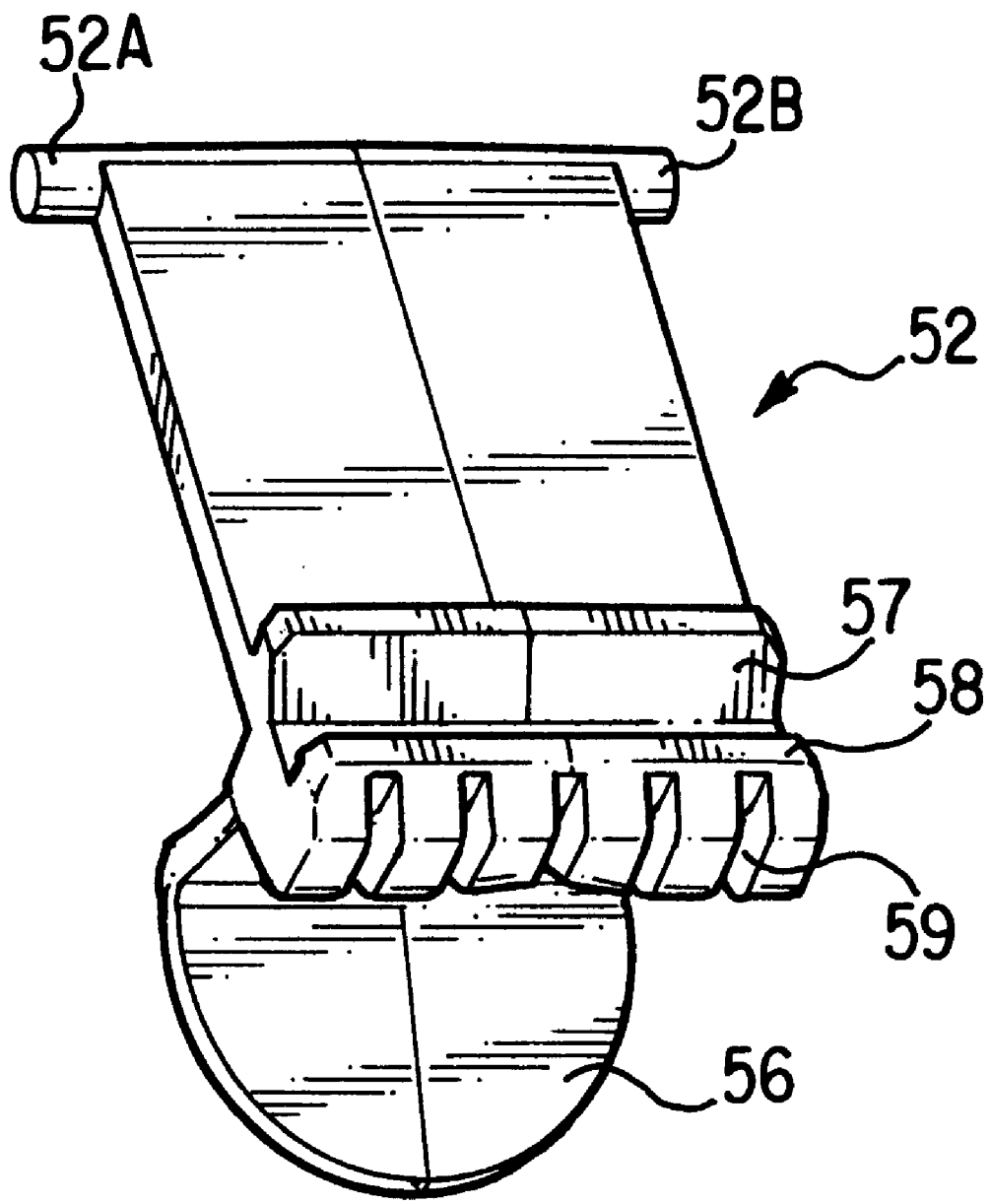
FIG. 7 is a perspective view of the pawl.

The central guide track engaging portion 46 of the adjuster plate 40 may include a raised central portion 43 having a recess 47 for housing a locking mechanism 50, shown in FIG. 7, that engages with the teeth 34 on the guide track 30, as well as two parallel ribs extending downwardly from both sides of the raised central portion and including guide rails 42, 44 for engagement with the guide rails on the guide track 30. The guide rails 42, 44 on the adjuster plate 40 are spaced far enough apart and are generally U-shaped in configuration so that they can be slidably engaged and interlocked with the guide rails 36, 38 on the guide track 30.

The laterally extending shoulder belt guide surfaces 48, 49 on both sides of the central guide track engaging portion 46 include laterally extending openings 48', 49' through which the shoulder belts 62 and 64 can be passed. The lateral openings 48', 49' through which the shoulder belts 62, 64 are passed and the guide surfaces 48, 49 along which the shoulder belts are guided are preferably smooth surfaces to reduce any friction generated as the adjuster plate 40 moves relative to the shoulder belts 62, 64.

Figure 2B:
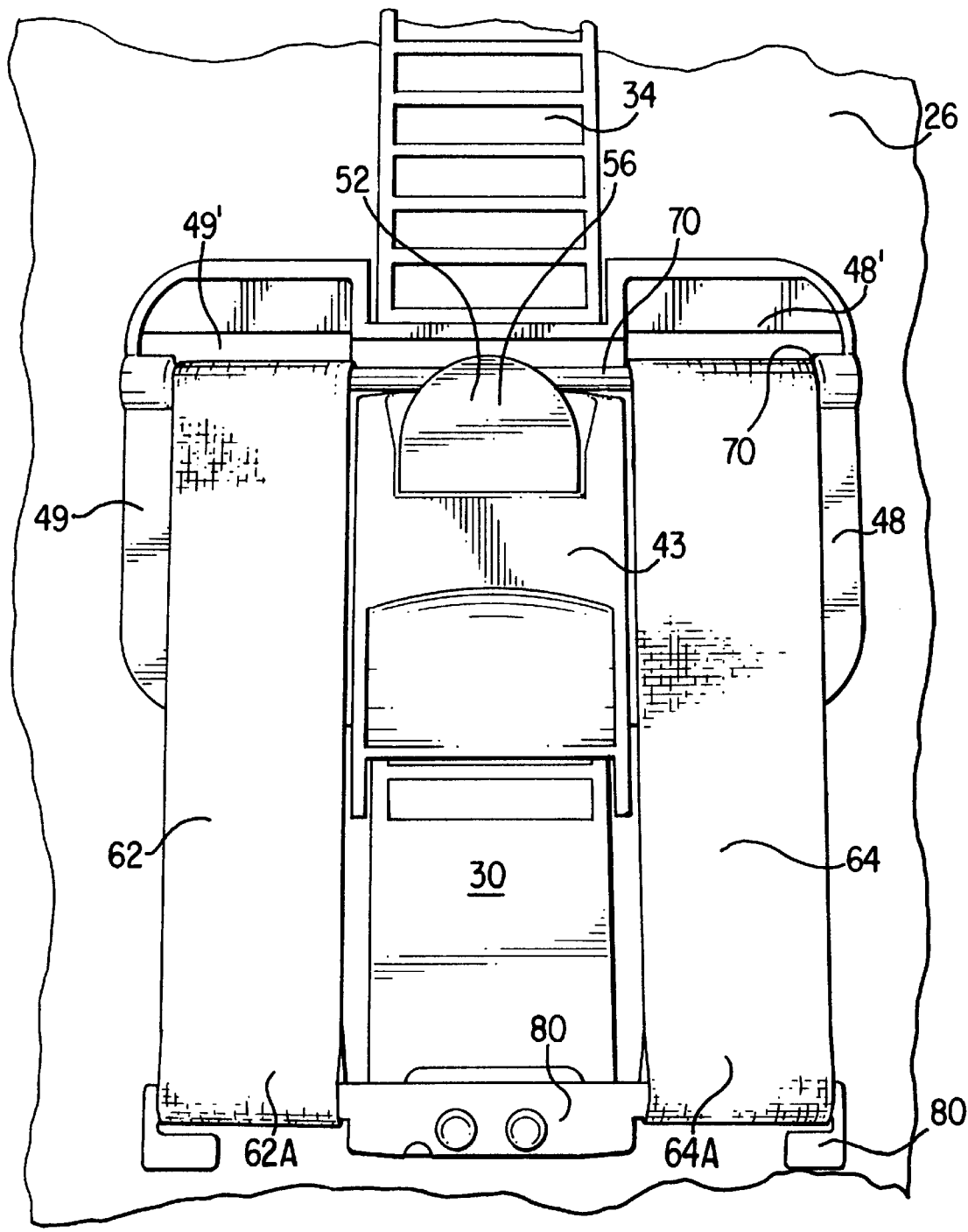
FIGS. 2B and 2C are enlarged rear elevation views, showing the adjuster plate in a lowered or retracted position and an upper or extended position, respectively.
Figure 2C:
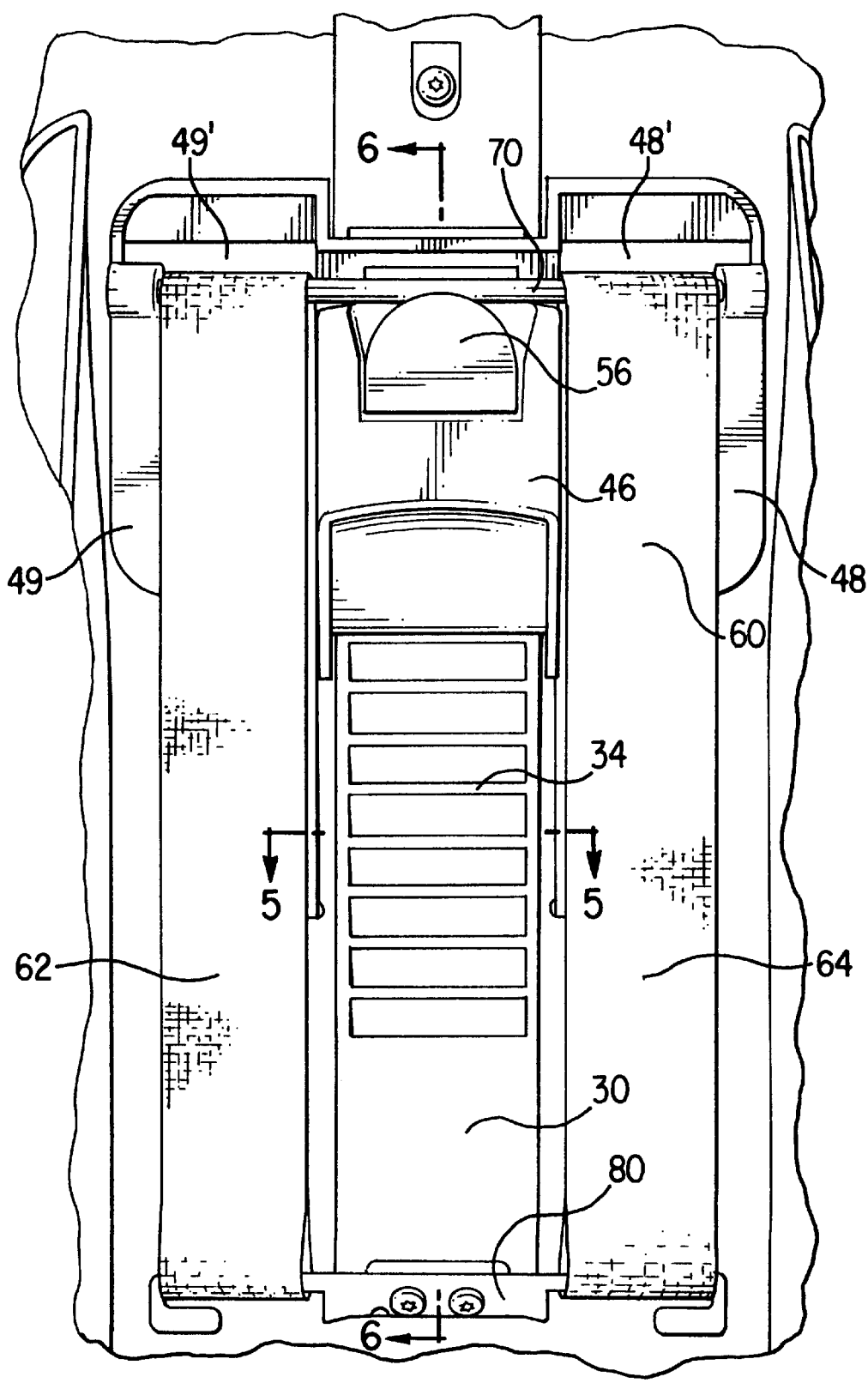

In a preferred embodiment, a smooth metal rod 70, best seen in FIG. 2C, can be inserted along the edges of the lateral openings 48', 49' through which the shoulder belts 62, 64 are passed in order to distribute the bearing load generated on the adjuster plate by the shoulder belts and to reduce the friction generated as the shoulder belts move through the openings.

As shown in FIGS. 2A–2C, the ends 62A and 64A of the shoulder belts 62 and 64 are passed through the adjuster plate openings 48', 49' and fixed in position relative to the car seat 10 at the connector bar 80 that is bolted to the end of the guide track 30.

Because the ends of the shoulder belts 62, 64 are fixed in position relative to the car seat 20, movement of the adjuster plate 40 along the guide track 30 results in an increase or decrease in the length of shoulder belt available on the front side of the car seat (i.e. segments 64D, 64E for shoulder belt 64) to place over the shoulders of a child. As the adjuster plate 40 is moved along the guide track 30, intermediate portions of the shoulder belts 62, 64 slide through the lateral openings 48', 49' and along the guide surfaces 48, 49 of the adjuster plate 40. Movement of the adjuster plate 40 along the guide track 30 by a distance equal to X results in a change in the length of shoulder belts 62, 64 on the front side of the seat approximately equal to 2X.

Figure 6:
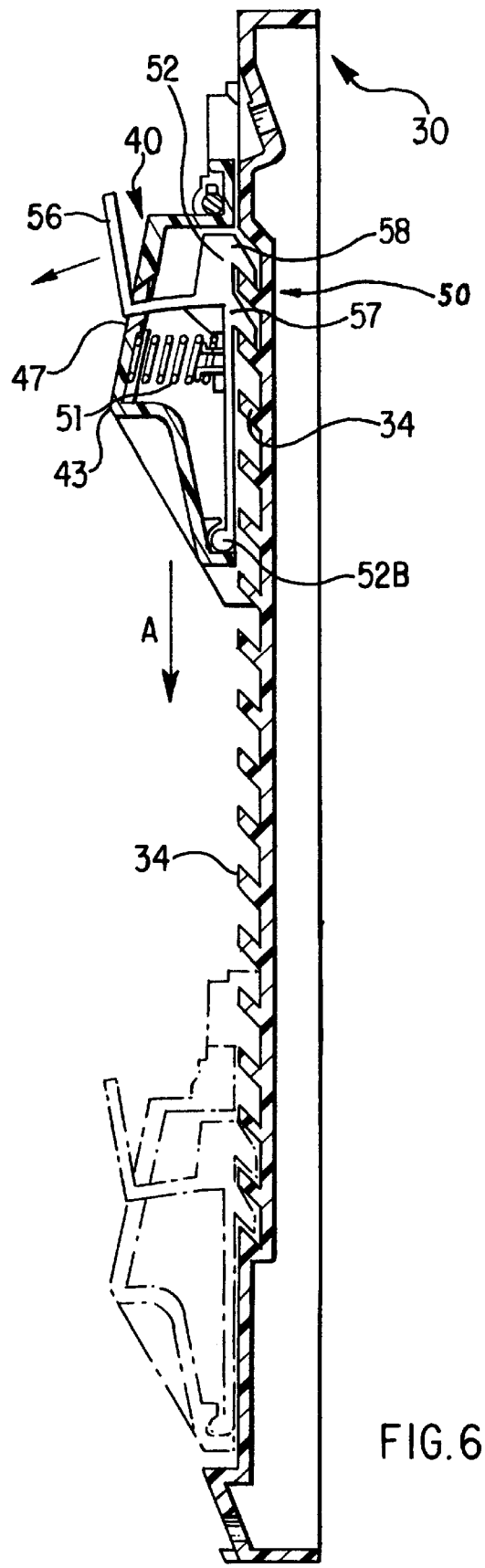
FIG. 6 is a side cross sectional view of the guide track and adjuster plate assembly taken along line 6—6 of FIG. 2C showing the pawl pivotally mounted on the adjuster plate and having teeth engaged with teeth on the guide track.

The adjuster plate 40 can be fixed on the guide track 30 in a selected position by the locking mechanism 50. In the preferred embodiment, locking mechanism 50 includes pawl 52 with teeth 57, 58, a spring 51, and teeth 34 on the guide track 30. Pawl 52 is pivotally mounted within the raised central portion 43 of the adjuster plate 40. The pawl 52 has laterally extending pivot arms 52A, 52B at one end and an angled actuating tongue 56 at the opposite end of the pawl. The angled actuating tongue 56 provides an ergonomic surface that can be easily grasped in order to deflect the pawl in a pivotal motion about the pivot arms 52A, 52B at the opposite end of the pawl 52, as best seen in FIG. 6.

Laterally extending teeth 57, 58 are formed on the pawl 52 below the actuating tongue 56 and are designed to engage and disengage smoothly from the lateral teeth 34. Pawl 52 is biased into engagement with the teeth 34 on the guide track 30 by spring 51, which is trapped between an upper surface of the pawl and a lower surface of the raised central portion 43 of adjuster plate 40. Assembly of the adjuster plate and pawl on the guide track traps the pawl between the adjuster plate 40 and the guide track 30. An upward force on the angled tongue 56 at one end of the pawl 52 causes the pawl to pivot about the pivot arms 52A, 52B at the opposite end of the pawl and the lateral teeth 57, 58 to disengage from the teeth 34 on the guide track 30.

An understanding of how movement of the adjuster plate 40 by an amount equal to X results in a change in the slack length of the shoulder belts 62, 64 by an amount approximately equal to 2X can be readily obtained by a comparison of FIGS. 2B and 2C, and FIG. 3. The shoulder belts 62, 64 extend from a fixed position at the connector bar 80, parallel to the guide track 30, over the guide surfaces 48, 49 of the adjuster plate 40 and through the lateral openings 48', 49' in the adjuster plate 40 before passing through openings 21 in the child restraint seat 20. The position of the ends 62A and 64A of the shoulder belts 62, 64 is fixed relative to the restraint seat by the connector bar 80. The openings 21 through the car seat are also predetermined in accordance with the size of the child to be placed in the child restraint seat. Movement of the adjuster plate 40 along the guide track 30 from a more retracted position, as shown in FIG. 2B, to a more extended position, as shown in FIG. 2C, changes the length of shoulder belts 62, 64 between the connector bar 80 and the lateral openings 48', 49' through the adjuster plate 40 (62B and 64B), and between the openings 21 through the restraint seat and the lateral openings 48', 49' in the adjuster plate 40 (62C and 64C), each by the amount that the adjuster plate 40 is moved along the guide track 30. Therefore, movement of the adjuster plate 40 along the guide track 30 by an amount equal to X results in a change in the slack length of the shoulder belts 62, 64 by an amount approximately equal to 2X.

As a result of the above-discussed design of the adjuster plate and pawl mechanism, a user can readily disengage the pawl 52 from the guide track 30 and move the adjuster plate 40 along the guide track 30 using a single hand. Movement of the adjuster plate 40 along the guide track 30 to a more retracted position, such as shown in FIG. 2B, generates more slack in the shoulder belts 62, 64 at the front side of the restraint seat. After the adjuster plate 40 has been moved to a retracted position, the shoulder belts 62, 64 on the front side of the restraint seat can be moved to the sides and draped over the sides of the seat body 20 in order to place a child in the seat. After a child is placed in the restraint seat, the seating side portions 62D and 64D of shoulder belts 62, 64 can be placed over the shoulders of the child and the adjuster plate 40 is moved to a more extended position, as shown in FIG. 2C, to tighten the shoulder belts around the child.

Any force on the shoulder belts attempting to increase the amount of slack length of the shoulder belts at the front side of the restraint seat generates a force on the adjuster plate in a direction toward the connector bar 80 at one end of the guide track 30, as represented by arrow A in FIG. 6. Movement of the adjuster plate 40 along the guide track 30 toward the connector bar end of the guide track 30 in the direction of arrow A is prevented when the actuating tongue 56 of the pawl 52 is in its normal position, with the lateral teeth 57, 58 of the pawl 52 being engaged with the guide track teeth 34. The pawl 52 is biased into engagement with the teeth 34 on the guide track 30 such that release of the actuating tongue 56 results in the pawl 52 immediately engaging with the guide track 30. The laterally extending teeth 57, 58 on the pawl 52 are tapered in a direction toward the pivot arm end of the pawl such that an increased force on the adjuster plate and pawl assembly toward the connector arm end of the guide track results in the pawl being more firmly engaged with the corresponding teeth 34 of the guide track 30, which are tapered in a direction away from the connector bar end of the guide track.

The lateral openings 48', 49' through the adjuster plate 40 in the belt guiding portions 48, 49 of the adjuster plate 40 allow for free movement of the shoulder belts along the guide portions 48, 49 of the adjuster plate 40 as the adjuster plate is moved along the guide track 30. Edges of the lateral openings 48', 49' slide along the shoulder belts 62, 64 as the adjuster plate 40 is moved along the guide track 30, and constitute a tensioning means for changing the slack length of shoulder belts on the front side of the restraint seat. Sliding of the shoulder belts along the edges of the lateral openings 48', 49' through the adjuster plate 40 could result in abrasion of the edges of the lateral openings, and result in undesirable wear of the adjuster plate 40, as well as placing a large compressive load directly on the edges of the openings. Accordingly, a smooth, round metal bar 70 can be placed along the edges of the lateral openings contacted by the shoulder belts and held in position by recesses and raised portions molded integrally with the adjuster plate 40. The round metal bar 70 distributes the compressive loads over a larger area and provides a smooth, low friction and wear resistant surface along which the shoulder belts slide as the adjuster plate is moved along the guide track.

It will be understood that various modifications and changes can be made in the configuration of the system for tightening the shoulder belts in the child restraint seat according to the present invention. The materials from which the shoulder belts are made can be selected from a variety of conventional webbing materials including, but not limited to nylon webbing. The other components are preferably molded from plastics in order to provide a light weight, high strength, and inexpensive product. Alternative embodiments could include various components such as the guide track, the adjuster plate and the pawl being manufactured from materials other than plastic, such as die cast aluminum etc. The connector bar that anchors the ends of the harness belt at one end of the guide track could be formed integrally with the guide track rather than being a separate piece that is connected to the guide track. Although the adjuster is disclosed as moving linearly by sliding along a linear track, the adjuster could move along an arcuate path, such as by sliding along an arcuate guide track, or being pivotally mounted for rotation. Similarly, instead of moving parallel to the seat back, the adjuster could move at an angle away from the back side of the seat. The harness belt could be looped additional times between fixed points on the back side of the seat and a movable adjuster to further multiply the amount of change in length of shoulder belts on the front side of the seat for a given amount of movement of the adjuster. Although the locking mechanism for fixing a selected position of the adjuster is disclosed as a spring-biased pawl and toothed rack, any other suitable locking mechanism could be used, such as a pin engageable with multiple sockets. Alternative embodiments could also include the seat being formed from an upper and a lower seat portion that are pivotally connected so that the seat can be transformed from a straight configuration for holding a child in a prone position, to an angled configuration for holding a child in a seated position.

What is claimed is:

1. A child restraint seat, comprising:
   a harness belt having two opposite ends and an intermediate portion;
   an adjuster plate;
   a toothed rack;
   said adjuster plate having a pawl that is biased into contact with said toothed rack to adjustably connect said adjuster plate to said toothed rack at various positions along said toothed rack; and
   said adjuster plate having an opening therethrough with said intermediate portion of said harness belt passing through said opening such that movement of said adjuster plate by a first amount changes a slack length of said harness belt by a second amount that is approximately two times said first amount.

2. The child restraint seat according to claim 1, wherein said toothed rack includes a plurality of parallel, laterally extending teeth that are perpendicular to a longitudinal axis of said toothed rack; and
   said pawl includes at least one laterally extending tooth that is shaped to engage with said laterally extending teeth of said toothed rack.

3. The child restraint seat according to claim 2, wherein said ends of said harness belt are fixed in position relative to said seat by a connector bar attached at one end of the toothed rack.

4. The child restraint seat according to claim 3, wherein said laterally extending teeth of said toothed rack each are angled away from said connector bar end of said toothed rack, and said at least one laterally extending tooth of said pawl is angled toward said connector bar end of said toothed rack.

5. The child restraint seat according to claim 1, wherein said harness belt extends from a front side of said seat through openings in said seat to a back side of said seat:
   said toothed rack being mounted on said backside of said seat; and said adjuster plate being slidably mounted on said toothed rack to achieve said change in slack length of said harness belt.

6. The child restraint seat according to claim 5, wherein at least one of said ends of said harness belt is attached to a connector bar that is fixed in position relative to said toothed rack.

7. The child restraint seat according to claim 6, wherein said intermediate portion of said harness belt contacts a smooth edge of said opening through said adjuster plate such that movement of said adjuster plate in a first direction along said toothed rack causes said harness belt to slide along said smooth edge and removes slack in said harness belt, while movement of said adjuster plate in a second direction opposite to said first direction increases slack in said harness belt.

8. The child restraint seat according to claim 7, wherein said smooth edge of said opening through said adjuster plate is formed by a round metal bar held in position along one side of said opening by portions of said adjuster plate.

9. The child restraint seat according to claim 1, wherein at least one of said ends of said harness belt is attached to a connector bar that is fixed in position relative to said toothed rack.

10. The child restraint seat according to claim 1, wherein said pawl is pivotally mounted at one end within a raised central portion of said adjuster plate, and an actuation tongue extends from the opposite end of the pawl upwardly out of an opening in the raised central portion of said adjuster plate.

11. A child restraint seat, comprising:
    a harness belt having two opposite ends and an intermediate portion;
    an adjuster plate;
    a toothed rack mounted on a back side of said seat;
    said adjuster plate being slidably mounted on said toothed rack and having an opening therethrough with said intermediate portion of said harness belt passing through said opening; and
    said two opposite ends of said harness belt being fixed in position relative to said seat by a connector bar, said connector bar being connected to one longitudinal end of said toothed rack.

12. The child restraint seat according to claim 11, wherein a pawl is pivotally mounted on said adjuster plate for movement into and out of engagement with said toothed rack to position said adjuster plate relative to said toothed rack.

13. The child restraint seat according to claim 12, wherein a smooth metal rod is provided along an edge of said adjuster plate opening for contact with said intermediate portion of said harness belt.

14. The child restraint seat according to claim 13, wherein said harness belt passes through openings from said back side to a front side of said seat, and wherein movement of said adjuster plate by a first distance along said toothed rack changes the length of harness belt from an opening through said seat to said adjuster plate opening and to said connector bar by an amount approximately equal to two times said first distance.

15. The child restraint seat according to claim 14, wherein movement of said adjuster plate along said toothed rack away from said connector bar reduces a length of slack belt on the front side of the seat by approximately two times said first distance.

16. A seat, comprising:
    a front seating side and a rear side;
    shoulder restraints passing through openings in said seat from said front seating side to said rear side, with ends of said shoulder restraints being fixed in position relative to said seat at said rear side; and
    an adjuster mounted on said rear side of said seat for movement relative to said seat and along intermediate portions of said shoulder restraints between said fixed ends and said openings, with movement of said adjuster by a first distance along said intermediate portions resulting in a change in length of the amount of said shoulder restraints positioned on the rear side of said seat that is a whole number multiple of said first distance, with said whole number being greater than 1.

17. The seat according to claim 16, wherein said shoulder restraints are part of a single harness belt.

18. The seat according to claim 16, wherein said shoulder restraints include two separate harness belts.

19. The seat according to claim 16, wherein said adjuster includes a guide track mounted on the back side of said seat, and an adjuster plate slidably mounted on said guide track, with said intermediate portions of said shoulder restraints passing through openings in said adjuster plate, and said ends of said shoulder restraints being fixed at one end of said guide track.

20. The seat according to claim 19, wherein said guide track has teeth and said adjuster plate pivotally supports a pawl having teeth that engage with said guide track teeth to position said adjuster plate relative to said guide track.

21. The seat according to claim 20, wherein said pawl is biased into engagement with said guide track.

22. A seat, comprising:
    a front seating side and a rear side;
    a harness belt having two ends, two shoulder belt portions and a center positioning portion;
    the two ends being fixed on said rear side, the two shoulder belt portions passing through openings in said seat from said rear side to said front seating side, and said center positioning portion being positioned both latitudinally and longitudinally relative to said seat by a pin protruding from said rear side through a hole in the center of said center positioning portion.

23. The seat according to claim 22, wherein said center positioning portion is held in position over said pin by L-shaped arms integral with a lower end of said rear side and depending from said rear side to protrude partially over said center positioning portion.

24. The seat according to claim 22, further including an adjuster mounted on said rear side for movement relative to said seat, and along an intermediate portion of said belt between said fixed ends and said openings through said seat.

25. The seat according to claim 24, wherein movement of said adjuster a first distance along said intermediate portion causes a length of said shoulder belt portions approximately equal to twice said first distance to pass through said openings.

* * * * *

UNITED STATES PATENT AND TRADEMARK OFFICE
CERTIFICATE OF CORRECTION

PATENT NO. : 6,155,638
DATED : Dec. 5, 2000
INVENTOR(S) : Bapst

It is certified that error appears in the above-identified patent and that said Letters Patent is hereby corrected as shown below:

On the title page
Assignee and Assignee's address, change "Fisher-Price, Inc., East Aurora, N.Y." to --Mattel, El Segundo, CA--.

Column 3, line 21, delete --is--.

Column 3, line 61, delete --lo--.

Signed and Sealed this

First Day of May, 2001

Attest:

NICHOLAS P. GODICI

*Attesting Officer*   Acting Director of the United States Patent and Trademark Office